(12) United States Patent
Toshniwal et al.

(10) Patent No.: US 9,497,183 B2
(45) Date of Patent: *Nov. 15, 2016

(54) SYSTEMS AND METHODS FOR AUTHORIZING SERVICES IN A TELECOMMUNICATIONS NETWORK

(71) Applicant: Sonus Networks, Inc, Westford, MA (US)

(72) Inventors: Siddharth Toshniwal, Kadugodi (IN); Shambhu Dayal Rai, Monmouth Junction, NJ (US); Nagesh Kumar Bollapalli, Bangalore (IN)

(73) Assignee: SONUS NETWORKS, INC., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/843,322

(22) Filed: Sep. 2, 2015

(65) Prior Publication Data

US 2015/0381601 A1 Dec. 31, 2015

Related U.S. Application Data

(63) Continuation of application No. 13/287,657, filed on Nov. 2, 2011, now Pat. No. 9,160,799.

(30) Foreign Application Priority Data

May 26, 2011 (IN) .......................... 1576/MUM/2011

(51) Int. Cl.
*G06F 15/16* (2006.01)
*H04L 29/06* (2006.01)
*H04L 29/08* (2006.01)
*H04W 4/00* (2009.01)

(52) U.S. Cl.
CPC ............. *H04L 63/08* (2013.01); *H04L 63/102* (2013.01); *H04L 65/1006* (2013.01); *H04L 65/1016* (2013.01); *H04L 65/1069* (2013.01); *H04L 65/1073* (2013.01); *H04L 65/1076* (2013.01); *H04L 67/16* (2013.01); *H04L 67/28* (2013.01); *H04L 67/303* (2013.01); *H04L 63/0892* (2013.01); *H04W 4/00* (2013.01)

(58) Field of Classification Search
CPC ....... H04L 63/08; H04L 67/16; H04L 67/28; H04L 67/303; H04L 65/1016; H04L 65/1073; H04L 65/1069; H04L 65/1076; H04L 65/1006; H04L 63/102; H04L 63/0892; H04W 4/00

See application file for complete search history.

(56) References Cited

U.S. PATENT DOCUMENTS

2005/0286452 A1* 12/2005 Hardgrave .......... H04W 84/005
370/310
2007/0211683 A1* 9/2007 Shaheen ............... H04W 28/06
370/338

(Continued)

*Primary Examiner* — Brian J Gillis
*Assistant Examiner* — Michael A Keller
(74) *Attorney, Agent, or Firm* — Stephen T. Straub; Ronald P. Straub; Michael P. Straub

(57) ABSTRACT

A computer-implemented method for authorizing access by a user device to at least one service offered over an Internet Protocol (IP) network is provided. A server receives a message from the user device. The message indicates that the user device is configured to support the at least one service. The server then retrieves from a database policy data associated with the user device. The server validates based on the policy data that the user device is authorized to advertise the at least one service and the at least one service is available for access by the user device. If the at least one service is unauthorized or unavailable for access by the user device, the server modifies the message to indicate one or more authorized and available services for the user device without including the at least one service.

20 Claims, 3 Drawing Sheets

(56) References Cited

U.S. PATENT DOCUMENTS

| | | | |
|---|---|---|---|
| 2009/0092061 A1* | 4/2009 | Shen | H04L 65/1016 370/254 |
| 2009/0178107 A1* | 7/2009 | Karjoth | G06F 17/30507 726/1 |
| 2010/0122281 A1* | 5/2010 | Wang | H04L 63/10 725/25 |
| 2011/0214051 A1* | 9/2011 | Petronijevic | G06F 17/30569 715/255 |
| 2012/0185604 A1* | 7/2012 | Shatsky | H04L 67/306 709/228 |

* cited by examiner

# SYSTEMS AND METHODS FOR AUTHORIZING SERVICES IN A TELECOMMUNICATIONS NETWORK

CROSS REFERENCE TO RELATED APPLICATIONS

This application claims the benefit of and priority to U.S. patent application Ser. No. 13/287,657 filed on Nov. 2, 2011 which is incorporated herein by reference in its entirety and which claims the benefit of and priority to Indian Patent Application No. 1576/MUM/2011 filed May 26, 2011, which is owned by the assignee of the instant application and the disclosure of which is incorporated herein by reference in its entirety.

FIELD OF THE INVENTION

The invention relates generally to systems and methods for indicating authorized and available services for a subscriber in a telecommunications network, and more particularly to indicating authorized and available services in a Session Initiation Protocol (SIP) network or an Internet-protocol Multimedia Subsystem (IMS) network.

BACKGROUND OF THE INVENTION

SIP is an application-level protocol for creating, modifying and/or terminating multimedia sessions. SIP can be applied in areas such as establishing and terminating voice, video and/or messaging sessions over the Internet. SIP also can be used to establish video conferencing, streaming multimedia distribution, instant messaging, filter transfer and online gaming. When establishing and terminating a multimedia communication, SIP can be used to determine user locations—the locations of end user systems for the communication, user availability—the willingness of a called party to engage in the communication, and user capabilities—the media or media parameters available for the communication. SIP also can be used to perform session setup by establishing session parameters for the parties involved and to manage sessions, including transferring and terminating sessions, modifying session parameters and invoking services within sessions.

IMS is an architectural framework for delivering Internet Protocol (IP) multimedia services. In many instances, IMS has adopted SIP for session management.

SUMMARY OF THE INVENTION

The invention, in various embodiments, features systems and methods for indicating to a subscriber of a telecommunications network whether one or more network services supported by the subscriber's user device are authorized and/or available for use by the user device. Such information can also be provided to other subscribers or servers of the network who are interested in knowing the information. The network can perform the service authorization check prior to or during session setup or during a procedure unrelated to establishing a communication session. The network is adapted to reject a user device's session setup attempt(s) if the user device has requested to access unauthorized or unavailable services. The network can also ensure that the capabilities advertised by one user device to other devices reflect the current status of services authorized and available for the user device.

In one aspect, a computer-implemented method for authorizing access by a user device to at least one service offered over an Internet Protocol (IP) network is provided. The method includes receiving, by a server, a message from the user device. The message indicates that the user device is configured to support the at least one service. The method also includes retrieving from a database, by the server, policy data associated with the user device. The method further includes validating, by the server, based on the policy data that the user device is authorized to advertise the at least one service and the at least one service is available for access by the user device. If the at least one service is unauthorized or unavailable for access by the user device, the server is adapted to modify the message to indicate one or more authorized and available services for the user device without including the at least one service. In addition, the method includes forwarding, by the server, the message.

In another aspect, a computing device for authorizing access by a user device to at least one service offered over an IP network is provided. The computing device includes a database for storing policy data associated with the user device. The computing device also includes a server for receiving a message from the user device. The message indicates that the user device is configured to support the at least one service. In addition, the server is configured to retrieve from the database policy data associated with the user device and validate based on the policy data that the user device is authorized to advertise the at least one service and the at least one service is available for access by the user device. If the at least one service is unauthorized or unavailable for access by the user device, the server modifies the message to indicate one or more authorized and available services for the user device without including the at least one service. In addition, the server can forward the message.

In yet another aspect, a computer program product, tangibly embodied in a computer readable medium, is provided for authorizing access by a user device to at least one service offered over an IP network. The computer program product includes instructions being operable to cause data processing apparatus to receive a message from the user device. The message indicates that the user device is configured to support the at least one service. The computer program product also includes instructions being operable to cause the data processing apparatus to retrieve from a database policy data associated with the user device and validate based on the policy data that the user device is authorized to advertise the at least one service and the at least one service is available for access by the user device. If the at least one service is unauthorized or unavailable for access by the user device, the server modifies the message to indicate one or more authorized and available services for the user device without including the at least one service. In addition, the message is forwarded.

In other examples, any of the aspects above can include one or more of the following features. In some embodiments, the message is related to session setup. In some embodiments, the message is not related to establishing a session. In some embodiments, the message includes a Session Initiation Protocol (SIP) REGISTER request. In some embodiments, the message includes a SIP PUBLISH request, a SIP OPTIONS request or a SIP NOTIFY request. In some embodiments, the message includes a SIP INVITE request, a SIP SUBSCRIBE request or a SIP REFER request.

In some embodiments, the server forwards the message to the user device. In some embodiments, the server forwards the message to a second user device or to a network server.

In some embodiments, the policy data indicates the one or more authorized services currently available to the user device. The policy data can be updated by examining at least one parameter associated with the user device or the IP network, determining one or more services currently authorized and available for use by the user device based on the at least one parameter, and removing at least a portion of the policy data corresponding to a service currently unavailable or unauthorized to the user device based on the determining. The at least one parameter can describe user location, user device network access capability, user device hardware capability, availability of a network resource, or a combination thereof. In some embodiments, the policy data is updated dynamically based on a change in the at least one parameter.

In some embodiments, the user device can subscribe to the server for notification of a change in service availability to the user device. In response, the server can notify the user device if the user device is not authorized to access a service or the service is not available to the user device.

In some embodiments, the user device is configured to support the one or more authorized services.

In some embodiments, retrieving the policy data from the database involves the server sending a Diameter Server Assignment request to the database.

In some embodiments, the server can include the at least one service in a message if the at least one service becomes authorized and available to the user device at a later time. The server then forwards the message to the user device or other devices in the network to indicate that the at least one service is now authorized and available to the user device.

In some embodiments, the server resides in a Serving Call Session Control Function (S-CSCF) node or an application server of an Internet Protocol Multimedia Subsystem (IMS) network. The database storing the policy data can reside in a Home Subscriber Service (HSS) of an IMS network. In some embodiments, the server resides in a SIP registrar or a home proxy of a non-IMS network.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
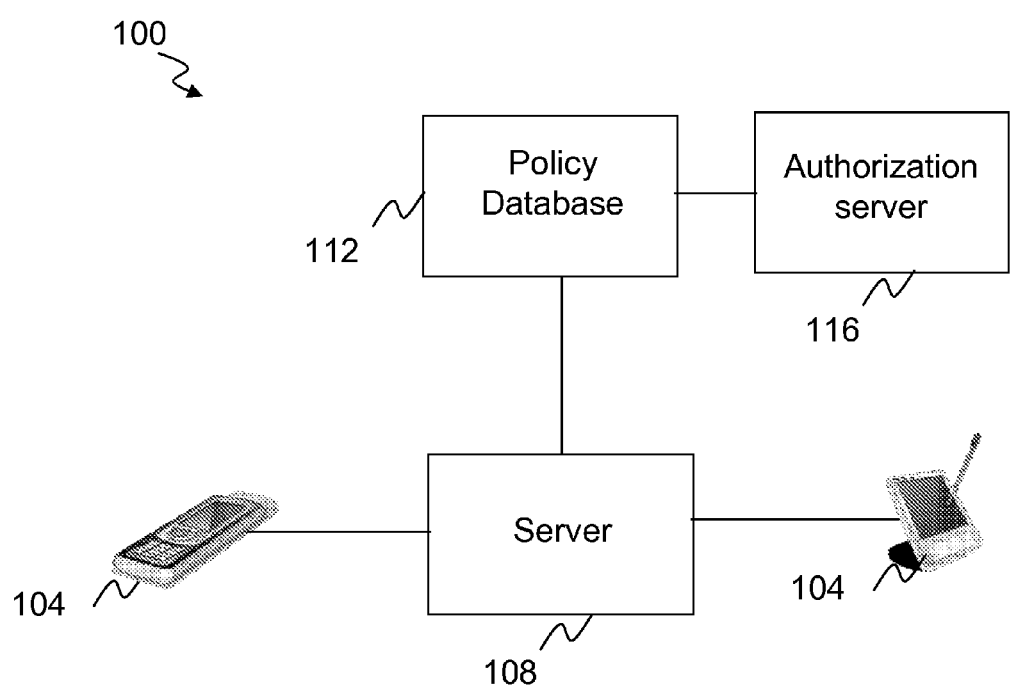
FIG. 1 shows a schematic diagram of an exemplary system for validating a service for use by a user device.

FIG. 1 shows a schematic diagram of an exemplary system 100 for authorizing service(s) for use by one or more user devices 104 in a network. Each user device 104 is associated with a subscriber. The network can be an IMS or a non-IMS network, such as a SIP network. The user device(s) 104 are coupled to a server 108, which is in turn coupled to a policy database 112 that communicates with a service authorization server 116.

A user device 104 can be a telephone, a computer, a personal digital assistant (PDA) or any other electronic device capable of receiving communication over a telecommunications network. In some embodiments, the user device 104 can include a network server, such as an application server.

The server 108 can receive SIP requests originating from or terminating at a user device 104 of a subscriber. In addition, the server 108 can cache policy data, downloaded from the policy database 112. The policy data indicates authorized and available services for a user device. In some embodiments, the server 108 caches the policy data for the lifetime of the user device's registration. In some embodiments, the server 108 caches the policy data for as long as the user device can use the services even when the user device is unregistered. The server 108 can also enforce service authorization for each user device based on the corresponding policy data downloaded from the policy database 112. In an IMS network, the server 108 can reside on a Serving Call Session Control Function (S-CSCF) node or an application server. In a non-IMS network, the server 108 can reside on a SIP registrar or a Home Proxy.

The policy database 112 hosts one or more services authorized and available for use to a user device associated with a subscriber of the network. In an IMS network, the policy database 112 can reside in the Home Subscriber Server (HSS) that maintains the profile of each subscriber. In a non-IMS network, according to some embodiments, the policy database 112 resides in the SIP registrar or the Home Proxy of the network. In some embodiments, in a non-IMS network, the policy database 112 resides in a centralized Authentication, Authorization, Accounting (AAA) Server that communicates to the SIP registrar or the Home Proxy via a communication means, such as over a RADIUS- or DIAMETER-based communication channel. In some embodiments, the policy database 112 communicates with the server 108 via a communication interface, such as the DIAMETER CX interface.

The service authorization server 116 can dynamically update policy data, stored in the policy database 112, to indicate available and/or authorized service(s) for the user devices 104. The service authorization server 116 performs such update based on, for example, user device location, subscription information, user device hardware capabilities, availability of certain network resources, operator policies and user device's capability to access network resources.

In some embodiments, the service authorization server 116 updates available and/or authorized service(s) for a user device 104 by first learning the type of Radio Access Technology (RAT) employed by the user device 104 to access the network. The service authorization server 116 then calculates which services are available to the user device 104 based on the user device's access network RAT type. Using the calculations, the service authorization server 116 updates the policy data in the policy database 112 associated with the user device 104.

In some embodiments, the service authorization server 116 learns the RAT type of an access network of a user device 104 based on the "access class" and/or "access-type" parameters in the P-Access-Network-Info header of a SIP message transmitted by the user device 104 to the server 108. In some embodiments, the service authorization server 116 learns a user device's RAT type by subscribing with the server 108, at the time of SIP registration by the user device 104, to receive notifications whenever a change occurs in the user device's RAT type. Upon receiving a notification regarding a RAT-type change, the service authorization server 116 updates the information about the user device 104 accordingly. In some embodiments, the service authorization server 116 learns the RAT type by querying the Terminating Access Domain Selection (T-ADS) information of the user device 104, which can reside in the policy server 112.

In some embodiments, when the service authorization server 116 decides that a provisioned service for a user device 104 should be disabled because it is not available or unauthorized, the service authorization server 116 updates policy data in the policy database 112 corresponding to the user device 104. In some embodiments, the policy data in the policy database 112 includes Dynamic Service Activation Information (DSAI). A change in the DSAI value masks or unmasks one or more initial filter criteria associated with the user device 104, which prompts the policy database 112 to send a message to the server 108 notifying the server 108 of the change in service authorization state for the user device 104. The initial filter criteria can specify one or more application servers that need to be invoked to provide a set of services to a user during a session setup call flow by the S-CSCF. If an initial filter criterion is masked, the service corresponding to the criterion is not provided to the user. Accordingly, the application server specified by the masked initial filter criterion is not invoked during the session setup call flow.

In some embodiments, the policy data in the policy database 112 includes service-related parameters, such as core network service authorization parameters, stored under the service profile for each user device 104 in the policy database 112. These parameters determine the services authorized and/or available for use by the user device 104.

Figure 2:
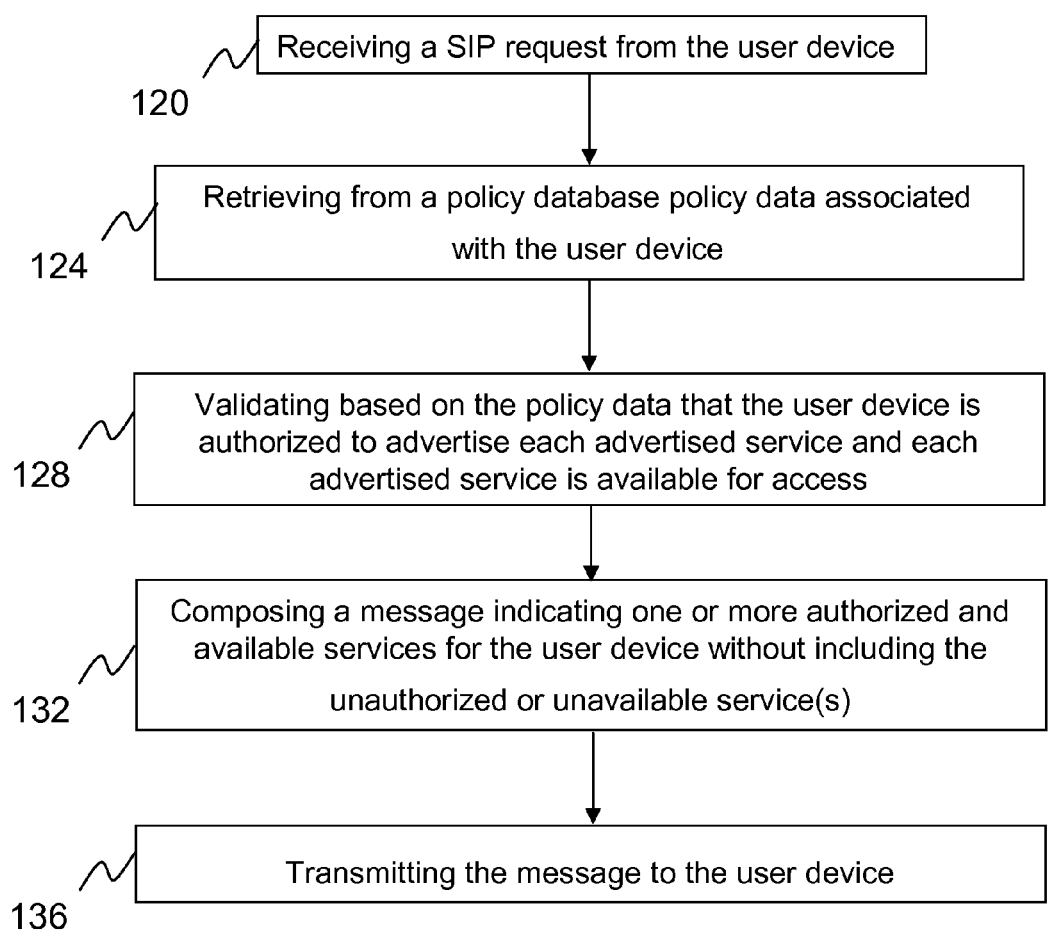
FIG. 2 shows a flow diagram illustrating an exemplary operation of the system of FIG. 1.

FIG. 2 shows an exemplary operation of the system 100 for validating services for a user device 104 upon receiving a SIP request from the user device. The SIP request can be a SIP REGISTER request that includes an address in its header field used by the server 108 to register the corresponding user device 104. In some embodiments, the SIP REGISTER request also includes information advertising to the network the user device's capabilities for receiving certain services. The advertised capabilities can be provided as parameters in the Contact header of the SIP REGISTER request.

In operation, the server 108 receives a SIP REGISTER request from the user device 104 (step 120). In response, the server 108 retrieves from the policy database 112 policy data about the service authorization and availability status corresponding to the user device 104 (step 124). In some embodiments, the server 108 retrieves the policy data from the policy database 112 by sending a Diameter Server Assignment Request (SAR) to the policy database 112. The policy data can indicate to the server 108 which services are authorized and available for access by the user device 104. In the event that the current policy information for the user device 104 has been previously fetched and is stored in a cache local to the server 108, the server 108 can retrieve the policy data from the local cache. Optionally, upon the receipt of the SIP REGISTER request, the server 108 can authenticate the user device 104.

Based on the policy data, the server 108 then validates that each of the services advertised by the user device 104 is authorized (step 128). In some embodiments, if a service is authorized for use by the user device 104, it may not be available to the user device 104. Therefore, the server 108 can also determine whether a service is available to the user device 104. The server 108 then composes a message indicating the set of services authorized and available for access by the user device 104 (step 132). In some embodiments, the message includes a 200 OK response to the SIP REGISTER request sent by the user device 104 during step 120 with the unauthorized or unavailable capability information removed from the Contact header of the request. Finally, the server 108 transmits the response to the user device 104 to indicate to the user device 104 the authorized and/or available services (step 136).

As an example, the user device 104 can advertise to the server 108 via a SIP REGISTER request that it is capable of supporting services A, B, and C. In response, the server 108 downloads from the policy database 112 policy data corresponding to the user device 104. The policy data may indicate that the user device 104 can only access services B and C, even though the user device 104 has advertised to the network that it is capable of supporting services A, B, and C. In such an instance, the server 108 removes the indication of service A from the Contact header of the 200 OK response to the SIP REGISTER request and forwards the response back to the user device 104.

As another example, a user device 104 sends to the server 108 a SIP REGISTER request with the following portion in its Contact header, indicating that the user device 104 supports both imageshare and videoshare services:

Contact: <sip:subscriber1@192.168.1.8>;
+g.3gpp.iari-ref:urn:urn-7:3gpp-
application.ims.iari.gsma-is; +g.3gpp.iari-
ref:urn:urn-7:3gpp-application.ims.iari.gsma-vs In response, the server 108 can send the following portion of the Contact header of a 200 OK response to the user device 104, indicating that while the imageshare service can be accessed, the videoshare service cannot:

Contact: <sip:subscriber1@192.168.1.8>;
+g.3gpp.iari-ref:urn:urn-7:3gpp-
application.ims.iari.gsma-is In some embodiments, during or after registration of a user device 104 with the server 108, the user device 104 can transmit a SIP SUBSCRIBE request to the server 108 to establish a subscription with the server 108 to receive notifications, via a SIP NOTIFY request, about a particular event, such as a change in support capabilities, associated with another user device 104 or with its own device 104. Both the SIP SUBSCRIBE and SIP NOTIFY requests are SIP procedures unrelated to establishing a communication session.

As an example, during SIP registration, a user device 104 can advertise via a SIP REGISTER request transmitted to the server 108 that it is capable of supporting services A, B, and C. The user device 104 can also send a SIP SUBSCRIBE request along with the SIP REGISTER request, subscribing to be notified of any changes in the authorization and/or service availability status of its own device. Based on the policy data of the user device 104 downloaded from the policy database 112, the server 108 may determine that only service A is available and authorized for access by the user device 104. In such a situation, the server 108 removes the indication of services B and C from the Contact header of the 200 OK response to the SIP REGISTER request and forwards the response back to the user device 104. In addition, the server 108 sends a SIP NOTIFY request to the user device 104, similarly notifying the user device 104 that it can only access service A.

As another example, a user device 104 sends to the server 108, along with a SIP SUBSCRIBE request, a SIP REGISTER indicating that the user device 104 supports both imageshare and videoshare services. In response, the server 108 can send the following portion of a NOTIFY request back to the user device, indicating that while the imageshare service is authorized and available, the videoshare service is not:

```
<?xml version="1.0"?>
<reginfo xmlns="urn:ietf:params:xml:ns:reginfo"
version="1" state="full">
    <registration aor="sip:subscriber1@sp.net"
id="a7" state="active">
        <contact id="77" state="active"
event="registered">
            <uri>sip:subscriber1@192.168.1.8 </uri>
            <unknown-param name="+g.3gpp.iari-
ref:urn:urn-7:3gpp-application.ims.iari.gsma-is"
/>
        </contact>
    </registration>
</reginfo>
```

Figure 3:
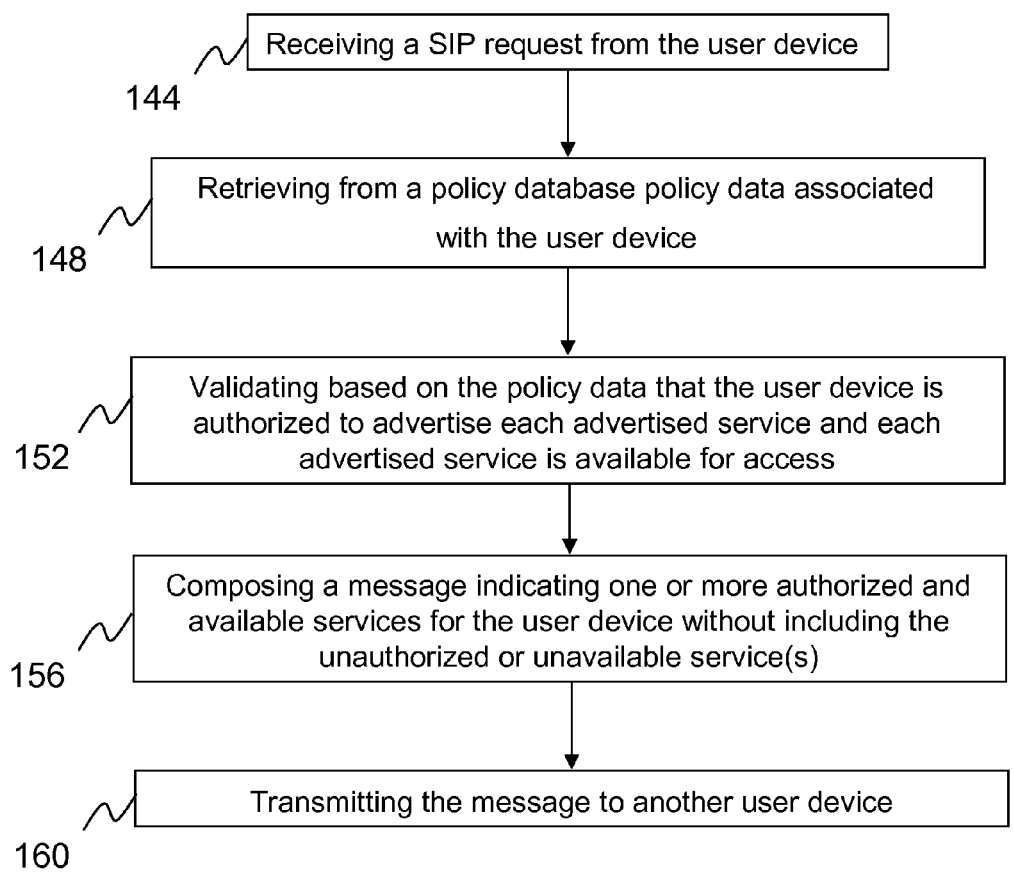
FIG. 3 shows a flow diagram illustrating another exemplary operation of the system of FIG. 1.

FIG. 3 shows another exemplary operation of the system 100 for validating services for a user device 104 upon receiving a SIP request from the user device 104. An exemplary SIP request can be a SIP INVITE request for initiating session setup, which includes an invitation from the sender device 104 to another user device 104 to establish a communication session. In some embodiments, a SIP INVITE request includes a Contact header with information about the sender device 104, including the sender device's capabilities for receiving certain services. Another exemplary SIP request can be a SIP PUBLISH request used by a sender device 104 to publish event state information to other devices 104 via the server 108. In some embodiments, a SIP PUBLISH request includes a message body, such as a Presence Information Data Format (PIDF) message body, with information that advertises the sender device's presence status as well as supported device capabilities. Another exemplary SIP request can be a SIP OPTIONS request used by a sender device 104 to query another device 104 or the server 108 about the capabilities of the other device 104 or the server 108. In some embodiments, a SIP OPTIONS request includes a Contact header with information advertising the sender device's supported capabilities. Yet another exemplary SIP request can be a SIP REFER request used by a sender device 104 to ask another device 104, via the server 108, to issue a SIP request. The SIP PUBLISH, SIP OPTIONS and SIP REFER requests are SIP procedures unrelated to establishing a communication session.

During operation, the server 108 receives a SIP request, such as a SIP INVITE, SIP PUBLISH, SIP OPTIONS or SIP REFER request, from the user device 104 (step 144). In response, the server 108 retrieves from the policy database 112 policy data about the service authorization and availability status corresponding to the user device 104 (step 148). In some embodiments, the server 108 retrieves the policy data from the policy database 112 by sending a Diameter SAR to the policy database 112. The policy data can indicate to the server 108 which services are authorized and/or available for access by the user device 104. In the event that the current policy information for the user device 104 has been previously fetched and is stored in a cache local to the server 108, the server 108 can retrieve the policy data from the local cache. Based on the policy data, the server 108 then validates that each of the services advertised by the user device 104 is authorized (step 152). In some embodiments, even if a service is authorized for use by the user device 104, it may not be available to the user device 104. Therefore, the server 108 can also determine whether a service is available to the user device 104.

The server 108 then composes a message indicating the set of services authorized and available for access by the user device 104 (step 156). In some embodiments, the message includes a modification of the SIP message sent by the user device 104 during step 144 with the unauthorized or unavailable capability information removed from the message. For instance, for a SIP INVITE or SIP OPTIONS request, the server 108 can remove from the Contact header of the request the unauthorized and unavailable capability information. For a SIP PUBLISH request, the server 108 can remove from the message body the unauthorized and unavailable capability information. Finally, the server 108 relays the modified SIP message to another network device 104 (step 160).

As another example, a user device 104 can send to the server 108 a SIP PUBLISH request with the following portion of a message body, indicates that the user device 104 supports both imageshare and videoshare services:

```
<?xml version="1.0" encoding="UTF-8"?>
<presence xmlns="urn:ietf:params:xml:ns:pidf"
            xmlns:op="urn:oma:xml:prs:pidf:oma-pres"
        xmlns:opd="urn:oma:xml:pde:pidf:ext"
        xmlns:c="urn:ietf:params:xml:ns:pidf:cipid"
entity="sip:+1234578901@operator.com;user=phone">
<tuple id="a1">
    <status><basic>open</basic></status>
    <op:service-description>
        <op:service-id>
org.gsma.imageshare</op:service-id>
        <op:version>1.0</op:version>
    </op:service-description>
    <contact>sip:subscriber1@192.168.1.8</contact>
</tuple>
<tuple id="a2">
    <status><basic>open</basic></status>
    <op:service-description>
        <op:service-id>
org.gsma.videoshare</op:service-id>
        <op:version>1.0</op:version>
    </op:service-description>
    <contact>sip:subscriber1@192.168.1.8</contact>
</tuple>
( ... rest of PIDF message body ... )
```

In response, the server 108 can modify a portion of the message body to indicate that while the imageshare service is authorized and available, the videoshare service is not. To make such a modification, the server 108 can insert a <barring-state> XML element to the message body as shown below:

```
<?xml version="1.0" encoding="UTF-8"?>
<presence xmlns="urn:ietf:params:xml:ns:pidf"
            xmlns:op="urn:oma:xml:prs:pidf:oma-pres"
            xmlns:opd="urn:oma:xml:pde:pidf:ext"
xmlns:c="urn:ietf:params:xml:ns:pidf:cipid"
entity="sip:+1234578901@operator.com;user=phone">
<tuple id="a1">
    <status><basic>open</basic></status>
    <op:service-description>
        <op:service-id>org.3gpp.cs-
```

-continued

```
        videotelephony</op:service-id>
            <op:version>1.0</op:version>
        </op:service-description>
        <contact>sip:subscriber1@192.168.1.8</contact>
    </tuple>
    <tuple id="a2">
        <status><basic>open</basic></status>
        <op:barring-state> terminated </op:barring-
state>
        <op:service-description>
            <op:service-id>
org.gsma.videoshare</op:service-id>
            <op:version>1.0</op:version>
        </op:service-description>
        <contact>sip:subscriber1@192.168.1.8</contact>
    </tuple>
    ( ... rest of PIDF message body ... )
```

In some embodiments, a second user device 104 can learn about the service authorization and availability status of a first user device 104 by using the SIP SUBSCRIBE-NOTIFY request method described above. For example, a second user device 104 can transmit a SIP SUBSCRIBE request to the server 108 to establish a subscription with the server 108 to receive notifications, via a SIP NOTIFY request, about a change in support capabilities associated with a first user device 104. Upon detecting a change in the authorization or availability status of the first user device 104, the server 108 is adapted to send a SIP NOTIFY request to the second user device 104 notifying the status change.

In some embodiments, the server 108 can continually and dynamically notify a first or second user device 104 the addition or removal of one or more services that are currently available and authorized for access by the first user device 104. For example, if the first user device 104 supports video calls, but is accessing the core network 100 via an access network that does not support video calling at the time of device registration, the server 108 can send a message to the first user device 104 during device registration to indicate that the video calling function is not authorized or available to the first user device 104. After registration is complete, if the first user device 104 roams to a different access network that supports video calling, the server 108 can send a message to the first user device 104 or other devices indicating that video calling is now authorized and available to the first user device 104.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for authorizing access by a user device to at least one service offered over an Internet Protocol (IP) network, comprising:
    receiving, by a server, a SIP message from the user device, wherein the SIP message includes information that indicates that the user device is configured to support the at least one service;
    retrieving from a database, by the server, policy data associated with the user device; validating, by the server, based on the policy data that the user device is authorized to advertise the at least one service and the at least one service is available for access by the user device; and
    when said validating determines that the at least one service is unauthorized or unavailable for access by the user device, modifying, by the server, the received message to generate a modified message, modifying said received message including omitting from said modified message information corresponding to the at least one service that is unauthorized or unavailable for access by the user device while including information from said received message indicating one or more authorized and available services for the user device;
    forwarding, by the server, the modified message to a second user device or to a network server; and
    dynamically updating the policy data associated with the user device based on a change in at least one parameter associated with the user device or the IP network.

2. The method of claim 1,
    wherein said forwarding includes forwarding the modified message to a second user;
    wherein the received message is one of a SIP INVITE message and a SIP OPTIONS message;
    wherein a Contact header of said received SIP message includes information indicating that the user device is configured to support image share and video share services; and
    wherein modifying said received message to generate a modified message includes removing from the Contact header of said received SIP message the information indicating that the user device is configured to support said video share services.

3. The method of claim 1, wherein modifying said received message to generate a modified message includes:
    adding information indicating that a service which was indicated by said received message to be supported by said user device is unavailable, said modified message including said added information.

4. The method of claim 1 wherein forwarding, by the modified message includes:
    forwarding the modified message to a second user device, said second user device being a user device with which said first user device may establish a communications session.

5. The method of claim 1, wherein the received message and the modified message are the same type of SIP messages.

6. The method of claim 1 wherein the policy data indicates the one or more authorized services currently available to the user device.

7. The method of claim 1 wherein said dynamically updating the policy data associated with the user device includes:
    examining the at least one parameter associated with the user device or the IP network;
    determining one or more services currently authorized and available for use by the user device based on the at least one parameter; and
    removing at least a portion of the policy data corresponding to a service currently unavailable or unauthorized to the user device based on the determining.

8. The method of claim 7 wherein the at least one parameter describes user location, user device network access capability, user device hardware capability, availability of a network resource, or a combination thereof.

9. The method of claim 1 wherein retrieving from the database the policy data comprises the server sending a Diameter Server Assignment request to the database.

10. The method of claim 1 further comprising;
subscribing, by the user device, to the server for notification of a change in service availability or authorization to the user device; and
notifying the user device, by the server, if the user device is not authorized to access a service or the service is not available to the user device.

11. The method of claim 1 wherein the user device is configured to support the one or more authorized services.

12. A method for authorizing access by a user device to at least one service offered over an internet Protocol (IP) network, comprising;
receiving, by a server, a SIP message from the user device, wherein the SIP message includes information that indicates that the user device is configured to support the at least one service,
retrieving from a database, by the server, policy data associated with the user device, said retrieving from the database the policy data comprises the server sending a Diameter Server Assignment request to the database;
validating, by the server, based on the policy data that the user device is authorized to advertise the at least one service and the at least one service is available for access by the user device; and
when said validating determines that the at least one service is unauthorized or unavailable for access by the user device, modifying, by the server, the received message to generate a modified message, modifying said received message including omitting from said modified message information corresponding to the at least one service that is unauthorized or unavailable for access by the user device while including information from said received message indicating one or more authorized and available services for the user device; and
forwarding, by the server, the modified message to a second user device or to a network server.

13. The method of claim 1 further comprising:
including, by the server, the at least one service in a message that is unauthorized or unavailable for access by the user device if the at least one service becomes authorized and available to the user device; and
forwarding, by the server, the message to indicate that the at least one service is authorized and available to the user device.

14. A system for authorizing access by a user device to at least one service offered over an IP network, comprising:
a database for storing policy data associated with the user device; and a server for receiving a SIP message from the user device, said SIP message including information indicating that the user device is configured to support the at least one service, the server being implemented in computer hardware including a processor for executing instructions and a memory device, said server being configured to:
retrieve from the database policy data associated with the user device;
validate based on the policy data that the user device is authorized to advertise the at least one service and the at least one service is available for access by the user device; and
when said validating determines that the at least one service is unauthorized or unavailable for access by the user device, modify the received message to generate a modified message, modifying said received message including omitting from said modified message information corresponding to the at least one service that is unauthorized or unavailable for access by the user device while including information from said received message to indicate one or more authorized and available services for the user device;
forward the modified message to a second user device or to a network server; and
dynamically update the policy data associated with the user device based on a change in at least one parameter associated with the user device or the IP network.

15. The system of claim 14 wherein the server resides in a Serving Call Session Control Function (S-CSCF) node or an application server of an Internet Protocol Multimedia Subsystem (IMS) network.

16. The system of claim 14 wherein the database storing the policy data is a Home Subscriber Service (HSS) in an IMS network.

17. The system of claim 14 wherein the server resides in a SIP registrar or a home proxy of a non-IMS network.

18. The system of claim 14 further comprising a module electronic circuitry for updating the policy data associated with the user device to indicate one or more services currently available and authorized to the user device.

19. The system of claim 18 wherein the module electronic circuitry updates the policy data based on information related to user location, user device network access capability, user device hardware capability, availability of a network resource, or a combination thereof.

20. A computer program product, tangibly embodied in a non-transitory computer readable medium, for authorizing access by a user device to at least one service offered over an IP network, the computer program product including instructions being operable to cause a data processing apparatus to:
receive a SIP message from the user device, wherein the SIP message includes information that indicates that the user device is configured to support the at least one service; retrieve from a database policy data associated with the user device;
validate based on the policy data that the user device is authorized to advertise the at least one service and the at least one service is available for access by the user device; and
when said validating determines that the at least one service is unauthorized or unavailable for access by the user device, modify the received message to generate a modified message, modifying said received message including omitting from said modified message information corresponding to the at least one service that is unauthorized or unavailable for access by the user device while including information from said received message to indicate one or more authorized and available services for the user device without including the at least one service;
forward the modified message to a second user device or to a network server; and
dynamically update the policy data associated with the user device based on a change in at least one parameter associated with the user device or the IP network.

* * * * *